United States Patent
Cardona

(10) Patent No.: US 7,040,847 B1
(45) Date of Patent: May 9, 2006

(54) ELECTRO MECHANICAL WEBBED PRE-TENSIONING WHEELCHAIR SECUREMENT SYSTEM

(75) Inventor: Edgardo Cardona, Atchison, KS (US)

(73) Assignee: Kinedyne Corporation, Lawrence, KS (US)

( * ) Notice: Subject to any disclaimer, the term of this patent is extended or adjusted under 35 U.S.C. 154(b) by 0 days.

(21) Appl. No.: 10/146,978

(22) Filed: May 16, 2002

Related U.S. Application Data

(60) Provisional application No. 60/292,748, filed on May 21, 2001.

(51) Int. Cl.
*B60P 3/06* (2006.01)

(52) U.S. Cl. .................. 410/7; 410/12; 410/29
(58) Field of Classification Search ............... 410/2–4, 410/7–12, 19, 22, 23, 51; 296/65.04
See application file for complete search history.

(56) References Cited

U.S. PATENT DOCUMENTS

| | | | |
|---|---|---|---|
| 3,572,802 A * | 3/1971 | Zupancic ................ 294/67.22 |
| 3,730,552 A | 5/1973 | Clark |
| 3,823,839 A * | 7/1974 | Petzing et al. ............. 414/462 |
| 3,878,955 A * | 4/1975 | Udden ..................... 414/462 |
| 4,039,096 A * | 8/1977 | McAllister ................ 414/462 |
| 4,093,303 A | 6/1978 | Nelson |
| 4,103,934 A | 8/1978 | Arnholt et al. |
| 4,134,509 A * | 1/1979 | Clement ................... 414/462 |
| 4,236,860 A * | 12/1980 | Gottlieb et al. ............ 414/462 |
| 4,242,030 A * | 12/1980 | Clement ................... 414/462 |
| 4,257,644 A * | 3/1981 | Stephens |
| 4,331,323 A * | 5/1982 | Sekimori et al. ............ 254/323 |
| 4,376,611 A * | 3/1983 | Koop ...................... 414/462 |
| 4,511,171 A | 4/1985 | Petersen |
| 4,541,511 A * | 9/1985 | Muller .................... 414/462 |
| 4,565,482 A * | 1/1986 | Baker ..................... 414/462 |
| 4,685,860 A * | 8/1987 | McFarland ................ 414/720 |
| 4,886,403 A * | 12/1989 | Gresham .................... 410/10 |
| 4,995,775 A | 2/1991 | Gresham |
| 5,154,563 A * | 10/1992 | Phillips .................. 414/462 |
| 5,295,664 A * | 3/1994 | Kamper .................... 254/220 |
| 5,628,595 A * | 5/1997 | Harris ...................... 410/7 |
| 5,647,407 A * | 7/1997 | Scott et al. ............. 140/123.5 |
| 5,827,036 A * | 10/1998 | Steffes et al. ............. 414/462 |
| 5,888,038 A | 3/1999 | Ditch et al. |
| 6,113,325 A | 9/2000 | Craft |
| 6,273,668 B1 * | 8/2001 | Kameda .................... 414/462 |
| 6,428,254 B1 * | 8/2002 | Craft ....................... 410/7 |
| 6,471,454 B1 * | 10/2002 | Koller ...................... 410/7 |
| 6,524,039 B1 * | 2/2003 | Magnuson et al. ............ 410/7 |
| 6,575,677 B1 * | 6/2003 | Craft ....................... 410/7 |
| 6,616,186 B1 * | 9/2003 | Midorikawa et al. ..... 280/801.1 |
| 6,728,616 B1 * | 4/2004 | Tabe ........................ 701/45 |
| 6,874,763 B1 * | 4/2005 | Sozzi ...................... 254/278 |
| 2002/0110434 A1 * | 8/2002 | Ditch et al. ................. 410/7 |
| 2004/0045757 A1 * | 3/2004 | Midorikawa et al. ........ 180/268 |

FOREIGN PATENT DOCUMENTS

| | | | |
|---|---|---|---|
| DE | 3727929 | * | 1/1989 |
| EP | 0800970 | * | 10/1997 |
| JP | 62275861 | * | 11/1987 |

* cited by examiner

*Primary Examiner*—H. Gutman
(74) *Attorney, Agent, or Firm*—Young & Basile, P.C.

(57) ABSTRACT

The invention is a device for securing a wheelchair to a vehicle. The invention incorporates a pair of belts disposed near a wheelchair station in a vehicle, the belts being remotely operable between tension and release positions. When not in use, the belts are stowed in compartments beside and underneath the floor of the vehicle to eliminate potential obstacles. The rear of the wheelchair is secured to the vehicle using remotely lockable anchor elements which are also retractable when the wheelchair station is not in use.

16 Claims, 7 Drawing Sheets

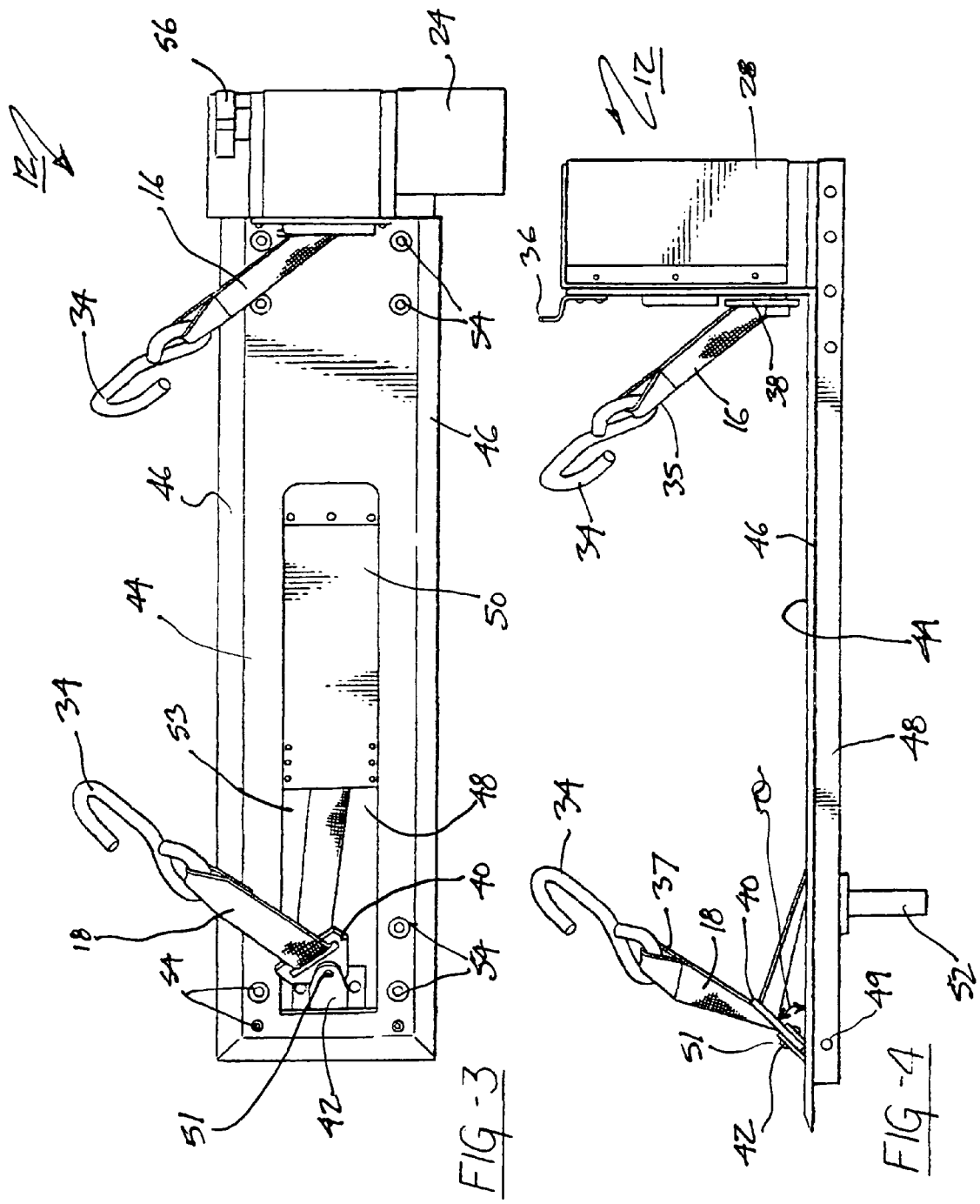

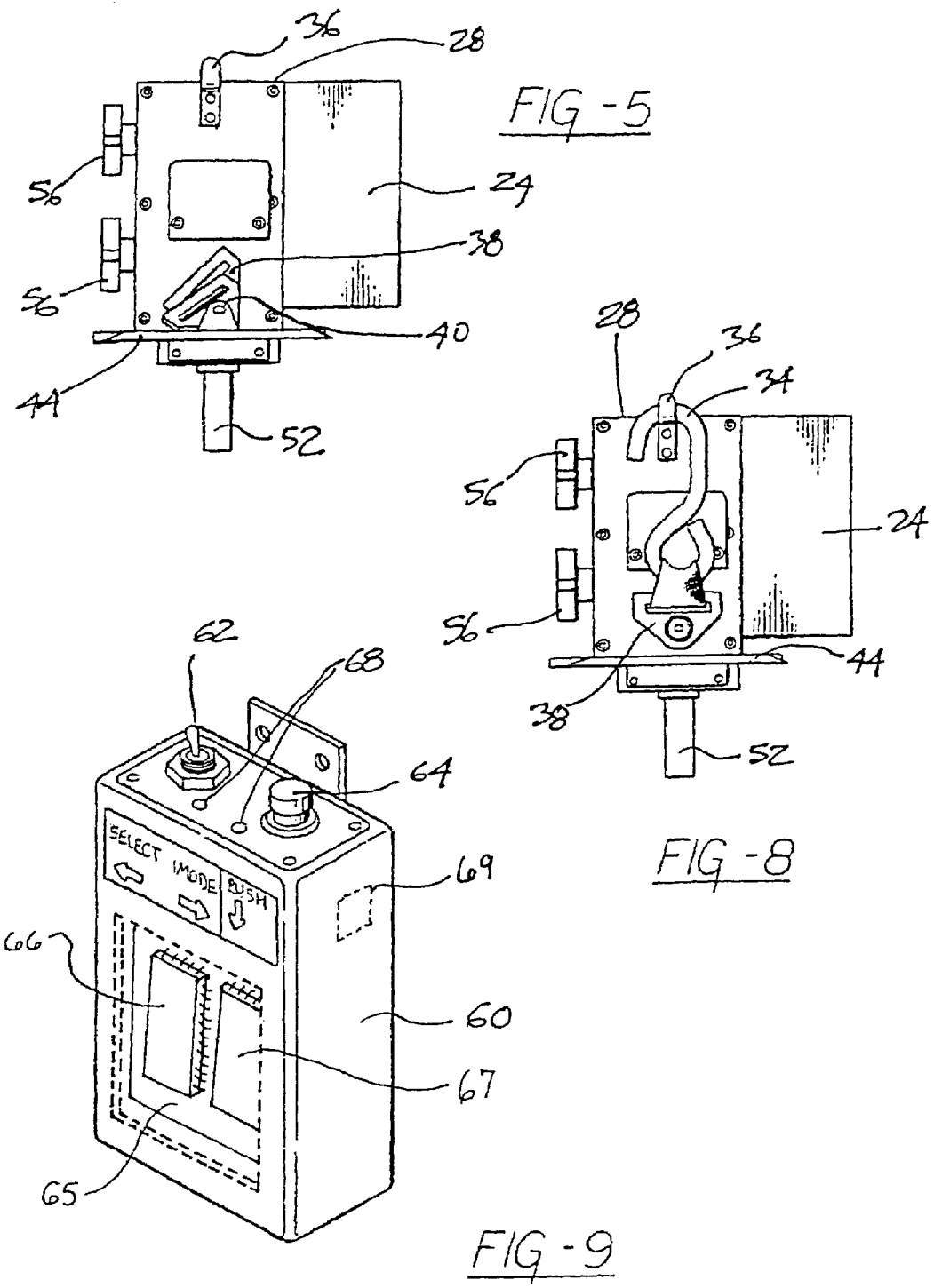

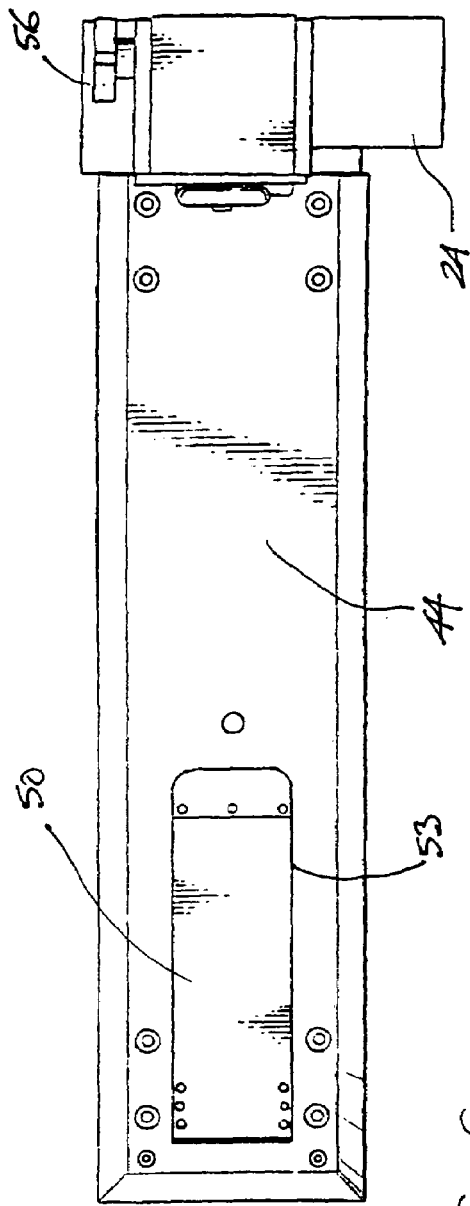
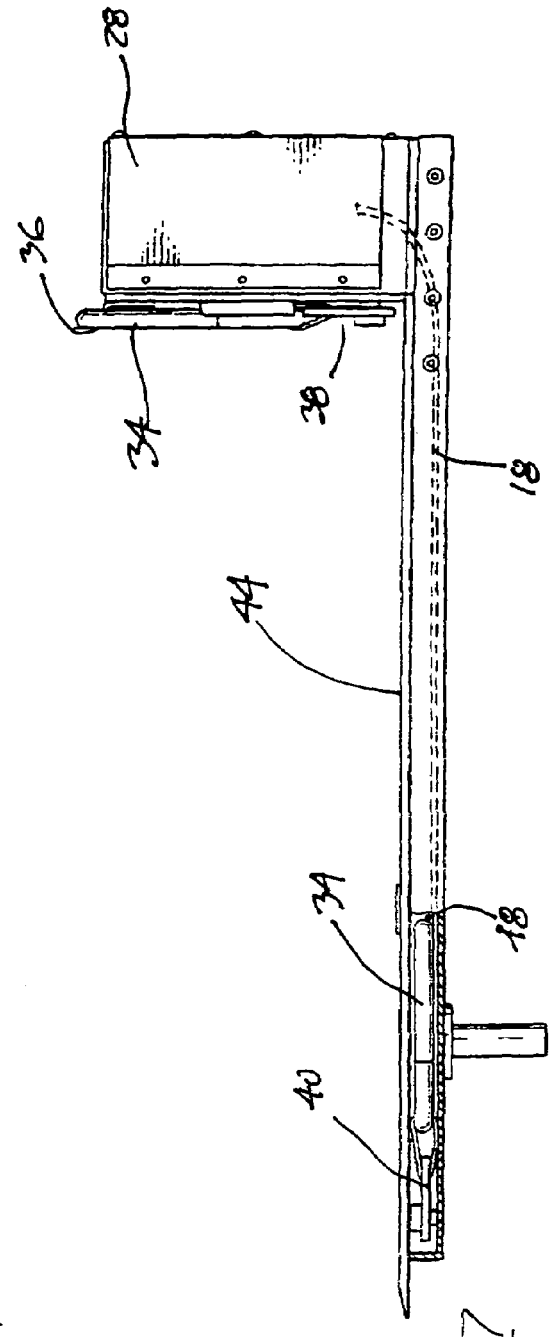
FIG-6
FIG-7

ELECTRO MECHANICAL WEBBED PRE-TENSIONING WHEELCHAIR SECUREMENT SYSTEM

RELATED APPLICATIONS

This application is related to, and claims the benefit of priority from, U.S. Provisional Patent Application Ser. No. 60/292,748, filed May 21, 2001.

FIELD OF THE INVENTION

This invention relates to devices for securing a wheelchair to a vehicle. In particular, the invention includes a system utilizing stowable webbed belts and utilizing a power system for providing tension on said belts.

BACKGROUND

In recent years, it has become a commonplace to provide wheelchair users with accommodations in mass transit vehicles, such as buses, trains or airplanes. Such accommodations typically allow these persons to ride in the vehicle while remaining in the wheelchair. It is desirable, under these circumstances, to secure the occupant and the wheelchair to the vehicle for the safety of the user of the wheelchair, as well as the safety of other occupants of the vehicle.

While numerous methodologies have been developed for securing wheelchairs to the interior of vehicles, many of the methods and devices developed for such securement create inconveniences to both the wheelchair passenger and the operator of the vehicle. Because the wheelchair-using passenger is frequently restricted in body movement, it is desirable to provide wheelchair securement systems which are easily reached and manipulated by the passenger. In the alternative, if such securement systems are not manipulative solely by the passenger, it is desirable to have them easily operable by the vehicle operator or an operator's assistant. It is also desirable to provide wheelchair securement systems which are easily repositioned within the vehicle to permit the space sometimes used by a wheelchair-using passenger to be readily converted for use by persons not so handicapped. For this reason, a wide variety of methodologies and devices have been developed in the form of stowable restraints for wheelchairs and wheelchair-using passengers. Preferably, such restraints should be positioned in the immediate vicinity of the area where a wheelchair will be secured. In known systems using a plurality of belts and anchors, however, (belts and anchors which are stowed remotely, for example, in a storage locker), such belts and anchors frequently become lost, damaged or soiled when not in use. Additionally, this type of restraint almost always requires installation in the vehicle and attachment to the wheelchair by someone other than the wheelchair occupant.

It is also known to provide wheelchair restraint systems which are secured to the vehicle and articulate between a stowed and an extended position. This type of technology is found in U.S. Pat. No. 5,888,038, issued to Ditch et al.; U.S. Pat. No. 6,113,325, issued to Craft. Even these systems, however, have an important drawback in that it is difficult to provide the necessary securement and tension to four discrete points on the wheelchair, in the fashion in which the anchoring apparatus for the wheelchair is usually attached to the vehicle, without the assistance of a person other than the wheelchair occupant. Existing systems are also awkward to use and store.

There is a need, therefore, for a wheelchair tie-down system which is easily attached to the wheelchair by the vehicle operator or the wheelchair occupant alone, which is similarly easy to tension, and which is readily stowable within the vehicle, eliminating the presence of any obstacles to other passengers when the system is not in use.

SUMMARY OF THE INVENTION

In accordance with the invention, a simple-to-use, easily installed tie-down system for wheelchairs is provided. The system is installed in public transportation vehicles in such a fashion as to present no obstacle to the traveling public when the system is not in use, but yet is readily available for operation when needed by a wheelchair-using passenger. The system allows the same space in a vehicle to be used, alternatively, by wheelchair-using passengers and by ambulatory passengers. In one embodiment, the components of the tie-down system are located in an area of the bus which may also be occupied by foldable chairs usable by ambulatory passengers. Preferably, these chairs may be readily moved away from the area to be occupied by a wheelchair-using passenger, and just as easily repositioned for conventional use as desired.

The system comprises a front tensioning assembly and one or more rear anchoring assemblies located in proximity to a wheelchair station. The tensioning and anchoring assemblies are mounted to the floor and walls of the vehicle in such a fashion as to provide the necessary security to restrain the wheelchair from movement during normal transit and in the event of a collision involving the vehicle. The tensioning elements of the system are provided with locking means, power-driven tensioning means as well as feedback means, to impart an appropriate amount of tension to the tensioning elements automatically. Manual tensioning means may also be provided.

In use by a wheelchair occupant, the system includes a front tensioning assembly having a cooperating pair of webbed belts which are provided with hooks to engage the front framework of a wheelchair. The belts are arranged in relationship to a front housing and front guide in such a fashion as to provide laterally spaced positions for the hooks and belts, thereby insuring that both the right front and left front portions of a wheelchair will be suitably engaged to restrict both longitudinal and lateral movement of the front of the wheelchair in relation to the vehicle. The front tensioning assembly also features a covered enclosure portion in which the inboard front belt and hook can be stowed when the tensioning system is not in use. This enclosure is designed with an extremely low profile, thereby presenting no obstacle to other passengers when the system is not in use by a wheelchair-using passenger. In one embodiment, one or more rear anchor assemblies are provided behind the wheelchair station in the vehicle, aft of the front tensioning assembly in such a fashion as to permit one or more hooks and belts from rear anchor assemblies to engage one or more portions of the rear of a wheelchair. Preferably, there are two cooperating rear anchor assemblies, one located near the inboard part of the wheelchair station and one located near the outboard part of the wheelchair station. These rear anchoring assemblies provide securement of the wheelchair from forward movement as well as from lateral movement.

In operation, the front tensioning belts and rear anchoring belts and their associated hooks are affixed to the four corner areas of the wheelchair and placed under tension securing the wheelchair from fore and aft or lateral movement.

One feature of the present invention is the utilization of power-driven means, preferably electrical, to provide tension to at least some of the tensioning belts, and feedback means to ascertain when the belts have been placed under suitable tension. These tensioning and feedback means are preferably automatic and fail-safe.

It is an object of this invention to provide a convenient tie-down system for a wheelchair passenger utilizing a motor vehicle having a wheelchair station.

It is a further object of this invention to provide a tie-down system which is easily utilized by the wheelchair occupant without the assistance of others, or which is convenient to use by a person assisting the wheelchair occupant.

Another object of this invention is to provide a wheelchair tie-down system having a powered tensioning means, thereby permitting appropriate tension to be supplied for securing the wheelchair in position in the vehicle without the need for manually tensioning of the securing belts.

Still another object of this invention is a wheelchair restraint system which is readily convertible to a stowed configuration, thereby minimizing obstruction or inconvenience of ambulatory passengers.

It is a further object of the invention to provide a wheelchair restraint system which is not subject to being misplaced, soiled or damaged, and which does not require complicated installation steps prior to each use.

These and other objects of the invention will be apparent from a review of the detailed description of the preferred embodiment, and from the drawings and claims which follow.

BRIEF DESCRIPTION OF THE DRAWINGS

FIG. 3 is a top view of the front tensioning assembly.

FIG. 4 is an elevation view of the front tensioning assembly showing the belts in the extended position.

FIG. 5 is a side view of the front tensioning assembly viewed from the inboard side.

FIG. 6 is a top view of the front tensioning assembly showing the belts and hooks in the stowed position.

FIG. 7 is an elevation view of the front tensioning assembly, showing the belts in the stowed position.

FIG. 8 is a side view of the front tensioning assembly, showing a stowed belt and hook, viewed from the inboard side.

FIG. 9 is a perspective view of the control box.

DETAILED DESCRIPTION OF THE PREFERRED EMBODIMENT

Figure 1:
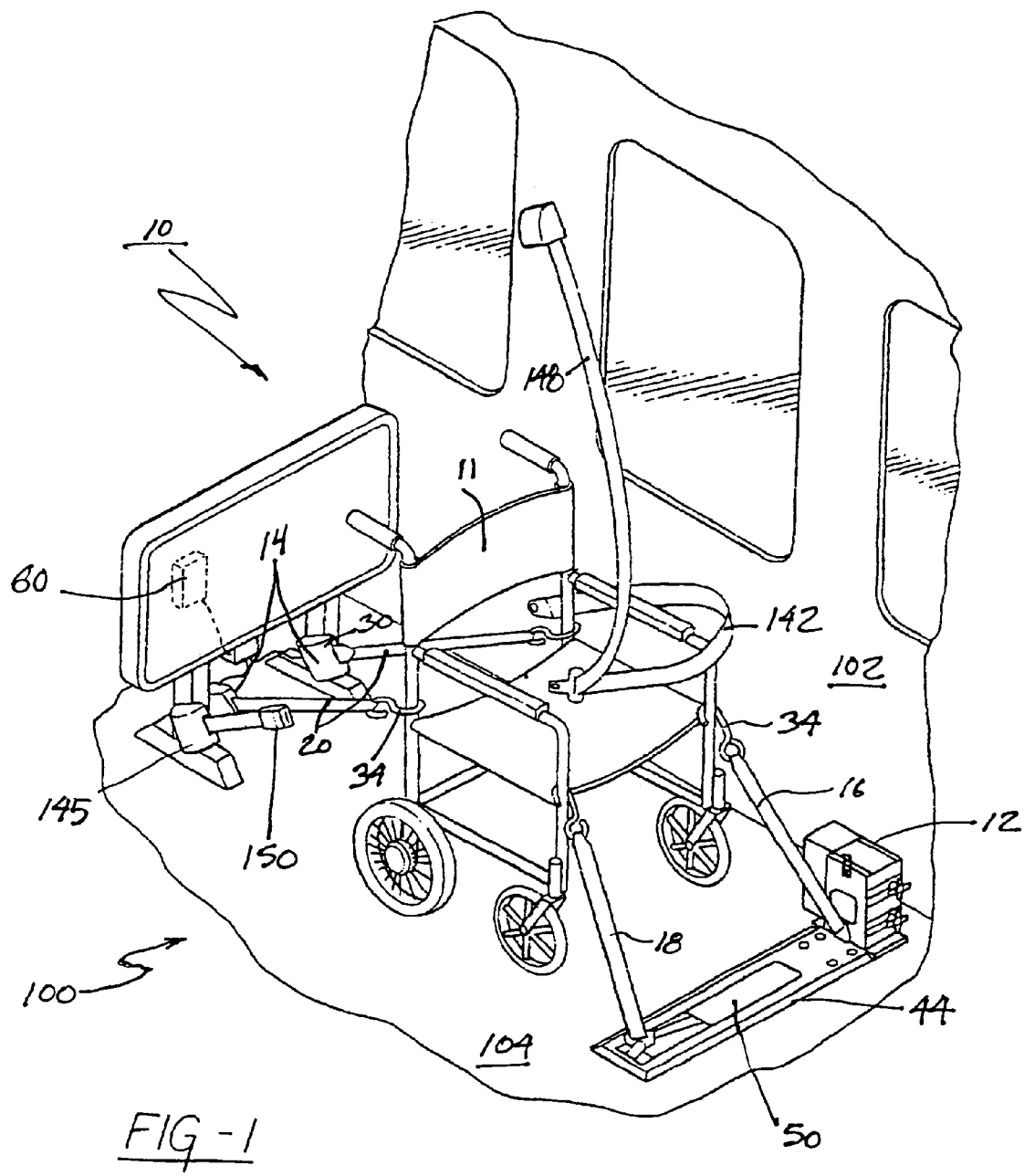
FIG. 1 is a perspective view of the elements of the present invention in a typical vehicle environment.

With reference first to FIG. 1, a wheelchair station 100 is provided in a vehicle having a floor 104 and one or more side walls 102. The wheelchair station is located between a front tensioning assembly 12 and one or more rear tensioning assemblies 14. A control system 60 is provided for providing tension to the front tensioning assembly 12 and rear tensioning assemblies 14. Together, the tensioning assemblies, with the associated controls and wiring constitutes the system 10 of the invention, designed to secure wheelchair 11 and its occupant to the station 100.

With reference now to FIGS. 1–9, the detailed elements of the front tensioning assembly 12 will be better understood. To provide suitable elements for securing and tensioning the front portion of a wheelchair 11, front tensioning assembly 12 comprises a front floor plate 44 secured to the floor 104 of a vehicle utilizing fasteners 54 which may be screws, rivets, bolts, or other well-known fastening means. The front floor plate 44 includes an enclosure portion 48, beveled edges 46, and cover plate 50 which is movable between an open position as shown in FIG. 3 and a closed position as shown in FIG. 6. Associated with front tensioning assembly 12 is a pair of tensioning belts, front outboard belt 16 and front inboard belt 18, both of which are provided with wheelchair-engaging hooks 34 attached to belts 16 and 18 by outboard belt loop 35 and inboard belt loop 37. Belts 16 and 18 are routed through belt guides 38 and 40 respectively. Belt guide 40 is attached to pivot assembly 42. Pivot assembly 42 is hinged at hinge point 49 permitting pivot assembly 42 to articulate through angle ⊖. Belt guide 40 is attached to pivot assembly 42 through pivot pin 51, thereby allowing belt guide 40 to rotate around the axis of pivot pin 51. In this fashion, belt 18 and belt guide 40 and pivot assembly 42 may be rotated into appropriate orientation for stowing the hook 34, belt 18, belt guide 40 and pivot assembly 42 underneath cover plate 50 when cover plate 50 is in the closed position as shown in FIG. 6. Preferably, the position of belt guide 40, belt 18 and belt hook 34 are located on the opposite end of front floor plate 44 from belt guide 38, and belt 16. This positioning insures that lateral support is provided to the front of the wheelchair 11 by belts 16 and 18 and their associated hooks 34.

As shown best in FIG. 4, a pivoting outboard belt guide 38 is affixed to front drive housing 28, which is in turn affixed to front floor plate 44. It will be appreciated that front floor plate 44 and front drive housing 28 will be attached to the floor 104 of the vehicle using appropriate fasteners 54 to insure that the front tensioning assembly 12 provides the necessary support to restrain the wheelchair 11 from movement in the event of a collision. The front drive housing 28 is provided with a hanger 36 adapted to support the hook 34 affixed to front outboard belt 16 when the front tensioning assembly 12 is not in use.

Preferably, the front floor plate 44 is provided with beveled edges 46 and cover plate 50, which, when the system is in its stowed or retracted position, provides a relatively smooth and unimpeding surface for other passengers to walk over without tripping. With further reference to FIGS. 1, 3 and 4, it will be appreciated that the configuration therein displayed is typical of the configuration in which the front tensioning assembly 12 would appear when in use. The two hooks 34 appear in the position that they would occupy if engaged with the front portion of a wheelchair 11. Under these circumstances, belts 16 and 18 extend from one or more storage reels located within drive housing 28. Sufficient belt webbing is provided for belt 16 and 18 to insure that they may be extended and retracted to accommodate a wide range of wheelchair styles and sizes. Within housing 28 is a roller guide (not shown) which guides belts 18 and 16 onto one or more storage reels (not shown) to prevent belts 16 and 18 from fouling or jamming during extension and retraction from and to the belt reel within housing 28. Cover plate 50 preferably slides over opening 53. The edges of cover plate 50 engage the edges of opening 53 in a secure fashion to prevent cover plate 50 from lifting upward away from front floor plate 44, or from downward movement into belt enclosure portion 48 through opening 53. This result may be easily accomplished by providing a tongue and groove-type engagement between the edges of opening 53 and cover plate 50. Cover plate 50 may also be provided with additional guides and rollers (not shown) to provide a low friction guiding action to that portion of belt 18 which passes through the belt enclosure portion 48.

In use, cover plate 50 is slid to the retracted position shown in FIG. 3, exposing belt guide 40, pivot assembly 42, belt 18 and belt hook 34. Likewise, belt 16 and belt hook 34 are removed from their stowed position on hanger 36 and attached to the wheelchair 11 in the approximate orientation shown in FIG. 1. FIG. 5 shows a typical orientation of belt guide 40 and belt guide 38, with belts 16 and belt 18 removed for clarity.

With reference now to FIG. 1, as well as to FIG. 4, it will be easily understood that tension may be applied to belts 16 and 18, thereby drawing those portions of belts 16 and 18 located between hooks 34 and guides 38 and 40 closer to guides 38 and 40, thereby tending to pull a wheelchair 11 affixed to hooks 34 in a forward direction. Assuming that the rear of the wheelchair 11 is secured from the rear, belts 16 and 18 will thereby provide tension to secure the wheelchair 11 from both forward and aft and lateral movement. In one embodiment, this tension is provided by front tension motor assembly 24 which is operatively coupled to a drive mechanism (not shown) located within front drive housing 28. In this embodiment, a simple gear train provides a speed reduction for motor assembly 24 and a corresponding increase in mechanical advantage to the belt storage reels contained within front drive housing 28. Motor 24 is operative in both clockwise and counter-clockwise directions, permitting tension on belts 16 and 18 to be selectively applied and released.

Although the preferred embodiment contemplates the use of electrical power as the motor driving source, it will be obvious to those skilled in the art that other power sources, such as pneumatic or hydraulic power may be used for motor 24. Further, as shown in FIGS. 1 and 3, belts 16 and 18 may be operated from separate storage reels driven by a common motor assembly 24 utilizing the necessary separate drive gear trains within housing 28. It can also be appreciated from FIG. 3 and FIG. 5 that manual tensioning screws 56 may be provided to manually drive the necessary gear trains within housing 28 to manually tighten or loosen the belts 16 and 18 when not using a powered system or in the event of a power failure in the system. It will also be appreciated that it is beneficial to provide a drain 52 in floor plate 44 to permit water and debris which may collect within the belt enclosure portion 48 to be removed from the vehicle.

Figure 2:
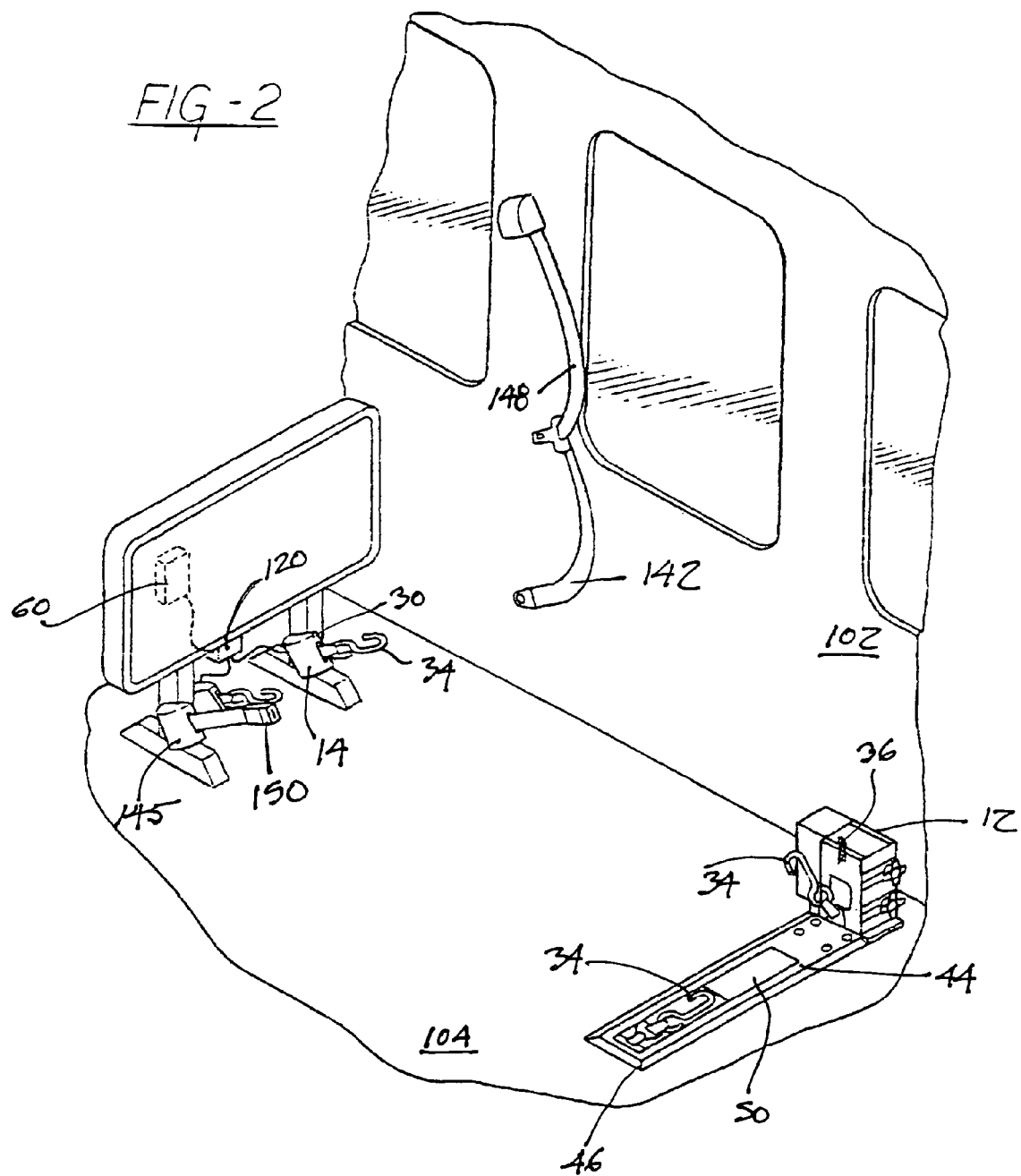
FIG. 2 is a perspective view of the main elements of the invention in a typical vehicle environment.

With reference now to FIGS. 2, 6 and 7, the stowed position of the front tensioning assembly belts will be easily understood. By providing sufficient tension to belts 16 and 18, belts 16 and 18 and their associated hooks 34 are drawn toward belt guides 38 and 40. When fully retracted, inboard belt hook 34 is stowed on hanger 36, and belt 18 and its associated hook 34 are stowed within belt enclosure portion 48. Cover plate 50 is slidably moved to cover opening 53 which will enclose both belt 18 and its associated hook 34. Passengers in the vehicle are then presented with a relatively flat and unimpeding surface comprising front floor plate 44 and cover plate 50.

With reference now to FIGS. 1 and 2, the orientation, mounting and operation of rear tensioning assemblies will be better understood. In the preferred embodiment, two rear tensioning assemblies 14 are provided with belts 20 and hooks 34. Again, it is desirable to locate one rear tensioning assembly 14 near the right rear of the wheelchair station 100 and one near the left rear of the wheelchair station 100, separated by sufficient distance to provide lateral support to the wheelchair 11 when the tensioning assemblies 14 are under tension. Within each rear tensioning assembly housing 30 is a spring biased reel adapted to spool and provide selective tension to belts 20. Preferably, belts 20 can be extended or retracted selectively by pulling on or releasing tension from said belts. Again, hooks 34 are affixed to belts 20 by loops sewn in the ends of belts 20.

Figure 10:
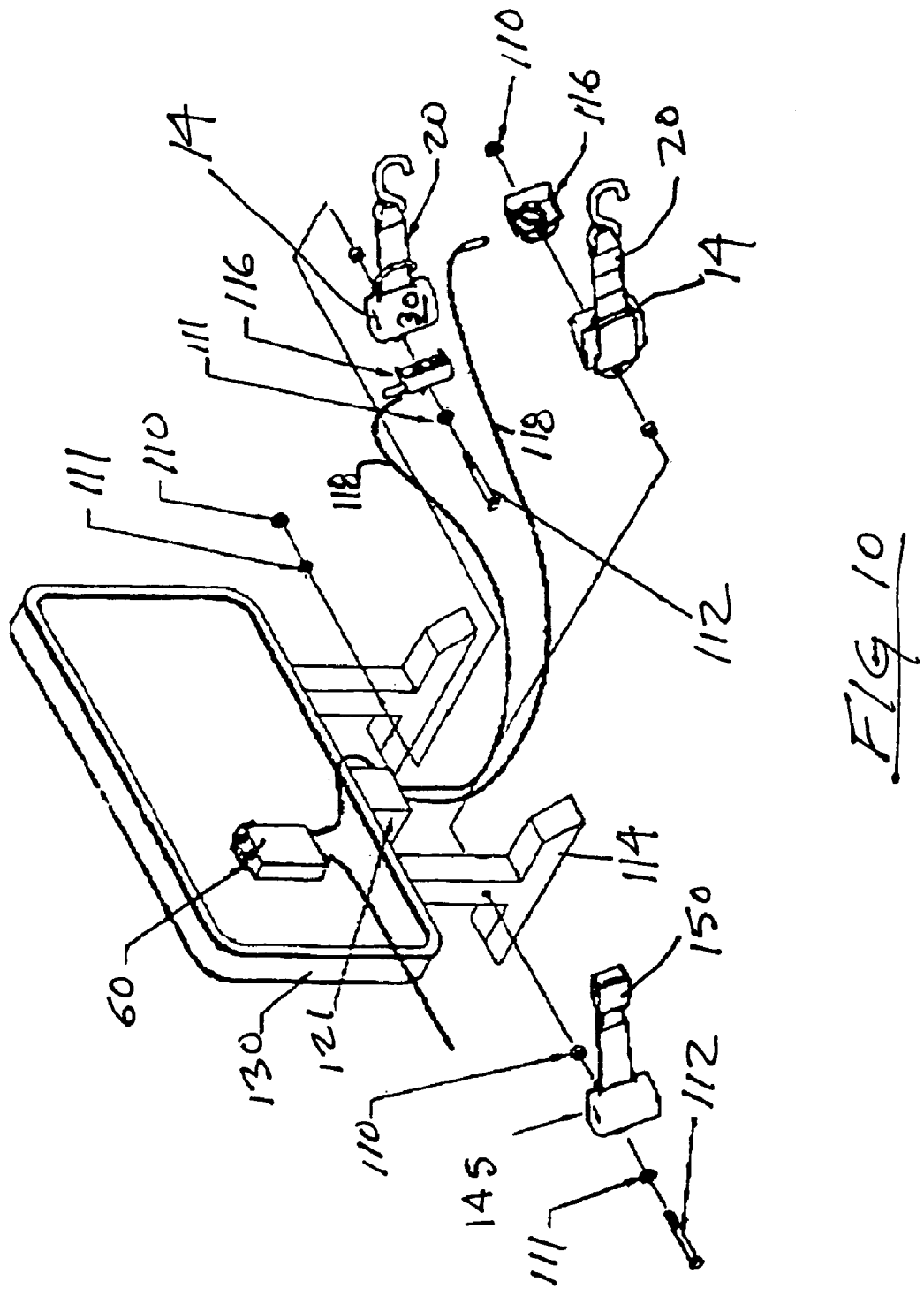
FIG. 10 is a perspective view of electrically powered rear tensioning elements.
Figure 11:
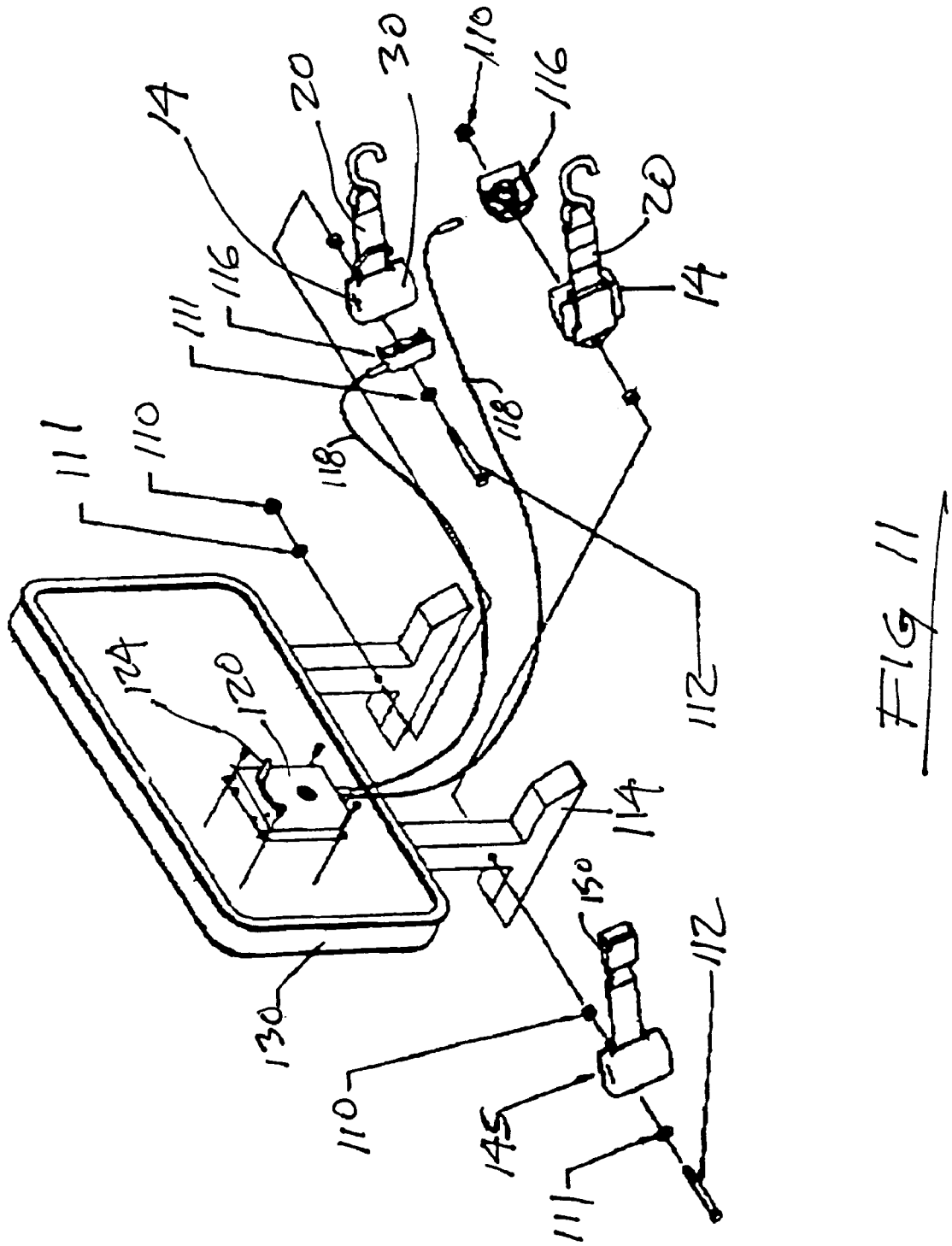
FIG. 11 is a perspective view of manually operable rear tensioning elements.

As shown in FIGS. 10 and 11, each rear tensioning assembly 14 is provided with a belt 20 and a spring biased reel (not shown) within a housing 30 and cooperating with the belt 20. Each rear tensioning assembly is affixed to the vehicle using fasteners, such as nuts 110 washers 111 and bolts 112, suitable for securing each rear tensioning assembly 14 to a suitable anchor point 114 on the vehicle. In one embodiment, this attachment point may be the support for a modesty panel 130 130 or seat frame. The rear tensioning assemblies 14 are provided with a selective release mechanism 116 cooperating with the spring biased reel inside housing 30. In this embodiment, the selective release mechanism 116 is secured to the rear tensioning assembly 14. A pawl within the selective release mechanism 116 may be selectively engaged with a portion of the spring biased reel, selectively preventing or allowing movement of the spring biased reel. Operation of the pawl within the selective release mechanism 116 is regulated by a flexible cable assembly 118. The distal end of each flexible cable assembly 118 engages a cable actuator assembly 120, 121. Cable actuator assembly 120, 121 may be provided with power means, or may be operated manually. Operation of the cable actuator assembly 120, 121 applies or releases tension from cable assemblies 118, thereby selectively applying or releasing tension to the selective release mechanism 116 associated with each rear tensioning assembly 14. The cable actuator assembly 120, 121 has a "locked" and a "release" position. When the cable actuator assembly 120, 121 is operated to the "lock" position, no tension is supplied to the cable assemblies 118, thereby allowing the pawl within the selective release mechanism 116 to be in its normally locked position, and preventing the spring biased reel within assembly 14 from movement. Operation of the cable actuator assembly 120, 121 to the "release" position applies tension on the cable assemblies 118, causing the pawl within the selective release mechanism 116 to be withdrawn from engagement with the spring biased reel, thereby permitting the belt 20 to be extended or withdrawn into the housing 30 of the rear tensioning assembly 14.

The basic operation of the system is shown in FIG. 1 and FIG. 9, which includes a simplified and stylized view of both a front tensioning assembly 12, two rear anchor assemblies 14 and a control box 60. In the preferred embodiment control box 60 includes both a means for providing an operating signal such as a drive circuit 66 and a means for measuring tension such as a sensing or feedback circuit 67. The front tensioning assembly 12 is provided with an electric motor assembly 24, in the present embodiment, to provide rotational motion and the necessary torque to tension and relax the belts. It will be readily understood that providing electrical power and controls to such electric motor assemblies is a task easily accomplished by a micro controller 65 with associated circuitry. Cooperating with the drive motor circuit 66 is a sensing circuit 67 which is designed as a means for measuring the amount of current being drawn by the electric motor in the invention. Drive motor current is known to be directly proportional to the motor torque, which in turn, is directly proportional to applied belt tension. It is known that when a desired belt tension is reached that the desired current level is also presented to the motor drive circuit 66. Referring to FIG. 9, a micro controller unit 65 within the control box 60 is preprogrammed to sense this desired current level, and to turn off the drive motor when this current level has been reached. The micro control unit 65 is completely automatic, and will continue to sample the tension on the belts 16 and 18 when the system is in operation. When the micro controller unit 65 determines that the belts 16 and 18 are appropriately tensioned, it will provide a signal in the form of indicator lights 68 which will visually confirm for the wheelchair occupant or vehicle operator that the wheelchair 11 is secured. The control box 60 is provided with a two-position selector switch 62. In one position, the system is configured for tensioning of the belts 16 and 18. In the other position, the system is configured for release of the belts 16 and 18. After selecting the desired operation, (tension or release) the start switch 64 is utilized to energize the circuit and provide the necessary drive signals to the tensioning motor. In the tension mode, if for some reason one or more belts 16 and 18 are not tensioned, means for indicating the condition of the operating signal such as the two indicator lights 68 will illuminate simultaneously indicating that the system has malfunctioned. The circuit is provided with means for electronically varying the amount of tension, such as potentiometers 69 for adjustments which allows the circuit to be easily calibrated for different belt tensions. In one embodiment, motor assembly 24 contains two separate motors. Separate drive circuits for each motor permit each belt 16 and 18 to be calibrated in such a way as to be tensioned independently from each other belt.

In operation, therefore, once the wheelchair 11 has been positioned in the station, the wheelchair occupant or the vehicle operator operates the system to release tension and unstow each of the belts from their retracted position and attach each associated hook to the appropriate corner portion of the wheelchair. If a manual cable actuator 120 is included with the system, the wheelchair occupant or vehicle operator will move the cable actuator control handle 124 to the "lock" position, thereby restricting the rear belts 20 from further extension from their respective housings 30. If a power cable actuator 121 is included with the system, actuation of the selector switch 62 to the tension position locks the selective release mechanisms 116. Once the four belts have been so positioned, the wheelchair occupant or vehicle operator will position the switch 62 to the tension position and operate switch 64. This operation sets into motion the automatic tensioning and feedback logic contained within the controller unit, sending a "lock" signal to an electronically powered cable actuator assembly 120, driving the appropriate belt tensioning motors of motor assembly 24 to their desired tensions, thereby securing the wheelchair 11 from both fore and aft and lateral movement within the vehicle. Power to the motors is then removed, effectively locking the tensioning belts 16 and 18 in their desired tensioned position.

Release of the wheelchair from the wheelchair station is accomplished by moving the switch 62 to the "release" position and operating the start switch 64 which results in a release of the tension on all belts, as a result of driving the motor 24 associated with the tensioning assembly 12 in the reverse direction from the tensioning direction. As soon as sufficient slack has been created in the belt tensioning system, the motors of motor assembly 24 are automatically de-energized, allowing the hooks 34 and belts 16 and 18 to be released from the wheelchair. If the system is equipped with a power cable actuator assembly 121, at the same time, the cable actuator assembly 121 is provided with a "release" signal, actuating the selective release mechanism 116 to permit the rear belts 20 to be extended from and retracted into their housings 30. If the system is equipped with a manual cable actuator assembly 120, the wheelchair occupant or vehicle operator will release the manual release handle 124 to accomplish the same result. Once the hooks 34 and belts 20, 16 and 18 have been released from the wheelchair, the switch 62 is again moved to the "tension" position and the start switch 64 operated. Stops built into the rear anchor assembly housing 30 prevents hooks 34 from retracting into the housing. Hanger 36 secures the hook 34 associated with belt 16 from retracting into guide 38. Guide 40 prevents hook 34 from excess movement. Accordingly, operation of the start switch 24 when a wheelchair 11 is no longer located in the wheelchair station 100 results in application of tension to the front belts 16 and 18 to place them in their fully retracted position. Once belt 18 is fully retracted, cover plate 50 can be positioned over opening 53, thereby completing the stowing process.

Another aspect of the system shown in FIG. 1 is the provision for standard occupant restraints in association with the invention to insure that a wheelchair occupant remains restrained in the wheelchair 11 being secured to the vehicle according to the present invention, in the form of conventional seat belt elements 145, 142 and 148. A quick release buckle 150 allows for securement and release of these conventional seat belt elements in relation to the passenger.

I claim:

1. An apparatus for securing a wheelchair to a vehicle, comprising:
   anchoring means for securing said wheelchair to said vehicle;
   means for providing variable tension between said wheelchair and said anchoring means through the use of an electrical motor; and
   a micro controller for regulating said means for providing variable tension between said wheelchair and said anchoring means.

2. An apparatus for securing a wheelchair to a surface comprising:
   front anchoring means adapted to engage a first section of said wheelchair;
   rear anchoring means adapted to engage a second section of said wheelchair;
   means for selectively locking and releasing said rear anchoring means;
   at least one electrical motor for selectively applying and releasing variable tension between said front anchoring means and said first section of said wheelchair;
   means for providing electrical current to said at least one electrical motor; and
   means for measuring the amount of electrical current being drawn by said at least one electrical motor to determine the level of tension being applied to said wheelchair.

3. An apparatus for securing a wheelchair to a surface comprising:
   a first pair of retractable webbed belts each having a distal end;
   hooks affixed to said distal ends of each of said first pair of belts;
   a low profile compartment secured to said surface for containment of at least one of said first pair of belts;

a retractable cover for said compartment;

a second pair of retractable webbed belts each having a distal end;

hooks affixed to said distal ends of each of said second pair of retractable webbed belts;

means for selectively locking and releasing said second pair of retractable webbed belts;

means for providing an operating signal;

means for automatically extending and retracting said first pair of belts in response to said operating signal through the use of an electrical motor;

means for powering said means for automatically extending and retracting said first pair of belts; and means for indicating the condition of said operating signal.

4. An apparatus for securing a wheelchair to a surface comprising:

a first pair of retractable webbed belts each having a distal end;

means for selectively extending and retracting said first pair of retractable webbed belts;

hooks affixed to said distal ends of each of said first pair of belts;

a low profile compartment secured to said surface for containment of at least one of said first pair of belts;

a retractable cover for said compartment;

a second pair of retractable webbed belts each having a distal end;

hooks affixed to the distal ends of each of said second pair of retractable webbed belts;

means for supplying positively biased tension to said second pair of retractable webbed belts;

means for selectively locking and releasing said second pair of retractable webbed belts;

means for driving said means for extending and retracting said first pair of belts between an extended position and a retracted position;

means for measuring the tension in said first pair of belts at regular intervals;

means for providing an electrical operating signal to said means for selectively locking and releasing and to said means for driving said means for extending and retracting said first pair of belts; and means for visually displaying the condition of said electrical operating signal to a user of the apparatus.

5. In an apparatus for securing a wheelchair to a station within a motor vehicle, said apparatus having a plurality of retractors having retractable webbed belts provided with hooks to engage a front portion of said wheelchair, said apparatus further having an anchoring means for engaging a rear portion of said wheelchair, said apparatus further having means for applying selective tension to said wheelchair, said webbed belts, and said anchoring means, the improvement comprising:

at least one electrical motor as said means for applying said selective tension to said wheelchair;

means for electronically varying the amount of said selective tension applied to said wheelchair; and means for measuring the amount of electrical current being drawn by said at least one electrical motor.

6. The invention of claim 5, further comprising means for remotely powering said anchoring means.

7. The invention of claim 5 or 6, which further comprises means for calculating the amount of said tension and increasing or decreasing said tension in response to said calculated tension.

8. The invention of claim 5 or 6, which further comprises remotely selectable engagement and release conditions for said anchoring means.

9. The invention of claim 7, which further comprises remotely selectable engagement and release conditions for said anchoring means.

10. In an apparatus for securing a wheelchair to a station within a motor vehicle, said apparatus having a plurality of retractors having retractable webbed belts provided with hooks to engage a front portion of said wheelchair, said apparatus further having an anchoring means for engaging a rear portion of said wheelchair, said apparatus further having means for applying selective tension to said wheelchair, said webbed belts, and said anchoring means, the improvement comprising:

means for remotely powering said means for applying said tension, means for periodically measuring the amount of said tension, means for determining if said tension is higher or lower than a desired tension, means for electronically varying said desired tension, and means for adjusting the operation of said power means to increase or decrease said tension in response to said measured tension.

11. In an apparatus for securing a wheelchair to a station within a motor vehicle, said apparatus having a plurality of retractors having retractable webbed belts provided with hooks to engage a front portion of said wheelchair, said apparatus further having an anchoring means for engaging a rear portion of said wheelchair, said apparatus further having means for applying selective tension to said wheelchair, said webbed belts, and said anchoring means, the improvement comprising:

means for remotely powering said means for applying said tension;

means for remotely powering said anchoring means;

means for calculating the amount of said tension as a function of the amount of electrical current provided to said means for applying said tension;

means for applying tension in response to said calculated tension; and means for releasing tension in response to said calculated tension.

12. An apparatus for applying tension to a wheelchair supported by a surface of a vehicle comprising:

an enclosure disposed at least partially below said surface;

a floor plate above said enclosure with an opening formed therein and said floor plate having an inboard end and an outboard end, and said floor plate supported by said surface;

a cover plate received in said opening, and said cover plate slidable between a closed position wherein said opening is blocked by said cover plate, and an open position wherein said opening is not blocked by said cover plate;

at least one pivot assembly having a belt guide operatively connected thereto and said belt guide pivotable between a storage position and a use position, said storage position characterized by said belt guide being disposed within said enclosure and said use position characterized by said belt guide being above said floor plate;

a belt having a first end and a second end and said belt passing through said belt guide at an intermediate point along said belt, and said belt being connected to said tensioning means at said first end and having a hook affixed to said second end; and means for applying tension to said first belt operatively connected to said first end of said first belt.

13. The apparatus for applying tension to a wheelchair supported by a surface of a vehicle of claim 12 further comprising:
    said means for applying tension located adjacent to said outboard end of said floor plate;
    said pivot assembly located adjacent to said inboard end of said floor plate; and
    said belt at least partially disposed below said floor plate.

14. In an apparatus for securing a wheelchair to a station within a motor vehicle, said apparatus having a plurality of retractable webbed belts provided with hooks to apply tension to a front portion of said wheelchair, said apparatus further having an anchoring means for engaging a rear portion of said wheelchair, the improvement comprising:
    at least one electrical motor for increasing and decreasing the amount of said tension applied to said wheelchair in response to an operating signal; and
    a micro controller for periodically measuring the electrical current supplied to said electrical motor, calculating the torque applied by said electrical motor based upon the electrical current supplied to said electrical motor, calculating the amount of said tension applied to said wheelchair based on the torque applied by said electrical motor, determining whether the amount of said tension is above or below a desired tension, and sending an appropriate operating signal to said at least one electrical motor.

15. An apparatus for securing a wheelchair to a vehicle, comprising:
    a first pair of webbed belts for securing said wheelchair to said vehicle;
    at least one electrical motor for providing tension between said first pair of webbed belts and said vehicle;
    a sensing circuit for measuring the amount of current drawn by said at least one motor; and
    a micro controller for operating said at least one electrical motor in either tension or release mode in response to said measured current.

16. The apparatus for securing a wheelchair to a vehicle of claim 15 further comprising:
    said micro controller including a drive circuit for determining whether said measured current corresponds to a tension in said first pair of webbed belts that is greater or less than a desired tension, and said drive circuit allowing electronical adjustability of said desired tension.

* * * * *

UNITED STATES PATENT AND TRADEMARK OFFICE
CERTIFICATE OF CORRECTION

PATENT NO. : 7,040,847 B1
APPLICATION NO. : 10/146978
DATED : May 9, 2006
INVENTOR(S) : Cardona It is certified that error appears in the above-identified patent and that said Letters Patent is hereby corrected as shown below:

Column 4, line 4, between "the" and "front", please insert - - means for applying tension such as the - -;

Column 5, line 25, between "by" and "front", please insert - - means for selectively extending and retracting such as - -;

Column 6, line 6, between "is" and "a", please insert - - a means for supplying positively biased tension such as - -;

Column 6, line 15, between "110" and "washers", please insert - -, - -;

Column 6, line 19, please delete the first "130";

Column 6, line 20, between "a" and "selective", please insert - - means for selectively locking and releasing such as a - -;

Column 6, line 23, after "A", please insert - - means for restricting movement such as a - -;

Column 7, line 50, delete "logic" and insert - - circuit 67 - -; and

Column 7, line 50-51, delete "controller unit" and insert - - control box 60 - -.

Signed and Sealed this

Twenty-second Day of August, 2006

JON W. DUDAS
*Director of the United States Patent and Trademark Office*